Feb. 2, 1965  K. DINTER ETAL  3,168,153
WEIGHING SYSTEM
Filed March 23, 1961  2 Sheets-Sheet 1
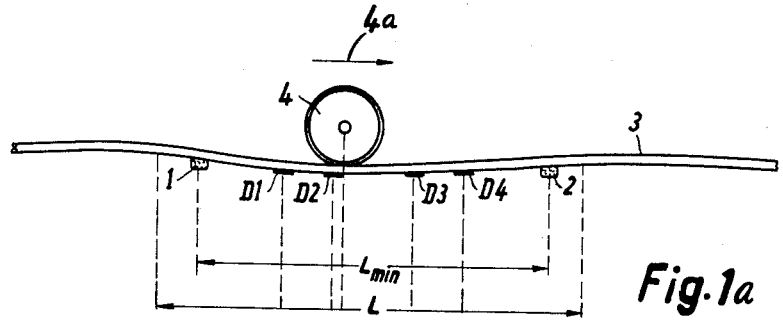
Fig. 1a
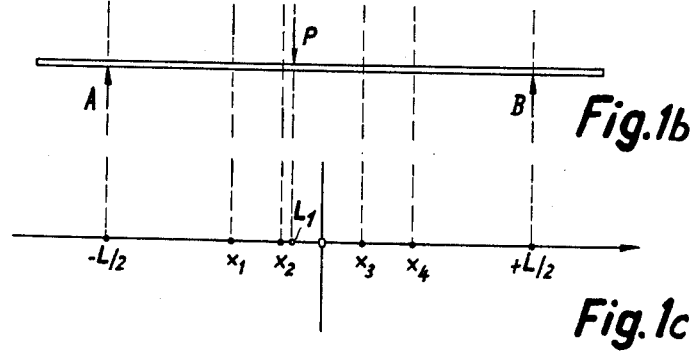
Fig. 1b
Fig. 1c
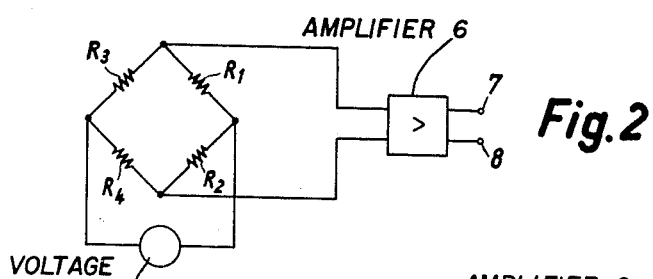
Fig. 2
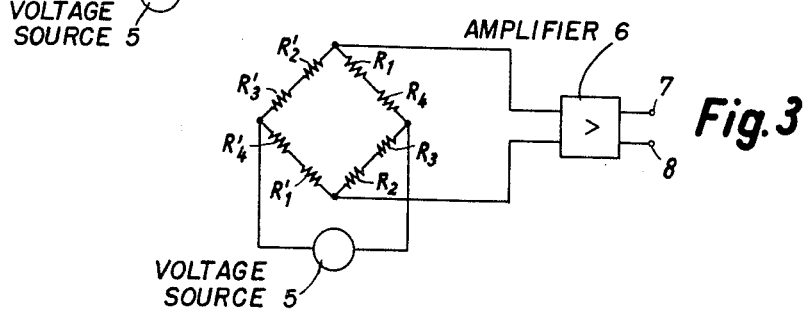
Fig. 3
INVENTORS
Konrad Dinter &
Peter Wentzel
BY Georgett Spencer
ATTORNEY INVENTORS
Konrad Dinter &
Peter Wentzel
BY George H. Spencer
ATTORNEY

United States Patent Office 3,168,153
Patented Feb. 2, 1965

3,168,153
WEIGHING SYSTEM
Konrad Dinter, Konstanz, and Peter Wentzel, Munich, Germany, assignors to Telefunken Aktiengesellschaft, Berlin, Germany
Filed Mar. 23, 1961, Ser. No. 97,787
Claims priority, application Germany Mar. 31, 1960
9 Claims. (Cl. 177—133)

The present invention relates to a system for determining the weight of a rail vehicle.

It is known to determine the weight of rail vehicles by measuring the extent to which a rail is bent under the influence of a vehicle axle running over the point at which the measurement is taken, this measuring being done, for example, by means of inductive, capacitative, or piezoelectric means. This method is based on the fact that, with the supports for the rail being spaced a given distance apart, the extent of the maximum bending, i.e., the depression of the rail, is proportional to the weight of the load.

It has been found, however, that the positioning of the ties and therefore the effective distance between consecutive supports for the rail—which distance is a factor that must be known in order to enable the weight to be computed accurately—are, in practice, far from constant. This distance can vary substantially within short periods of time due to climatic conditions, such as periods of freezing and thawing, so that it is simply not possible to obtain a weight measurement which can be expected to be accurate within the order of several percentage points.

It is, therefore, an object of the present invention to provide a system which, as the prior art, makes use of the elastic deformations of the rail in order to determine the weight of a vehicle, but which system is so constructed that the weight measurement is completely independent of the distance between consecutive supports for the rail section involved in the weight measurement, so that heretofore existing difficulties are completely overcome.

It is another object of the present invention to provide a weighing system which is unaffected by the quality or condition of the road bed.

With the above objects in view, the present invention resides mainly in a system for determining the weight of a rail vehicle wheel by measuring the elastic deformation to which a rail is subjected under the influence of the weight of the wheel, which rail is supported by ties spaced apart a given minimal distance. The system comprises four measuring means arranged, respectively, at four points $x_1$, $x_2$, $x_3$, $x_4$, along the rail, which points are within the minimal distance, for determining values $k_1 M_{x1}$, $k_2 M_{x2}$, $k_3 M_{x3}$, $k_4 M_{x4}$ which are proportional to the bending moments $M_{x1}$, $M_{x2}$, $M_{x3}$, $M_{x4}$ occurring at the points, respectively, and means for obtaining from these values the value $$k_0 \overline{P} = (p_1 k_1 M_{x1} - p_2 k_2 M_{x2})/(x_1 - x_2)$$
$$- (p_3 k_3 M_{x3} - p_4 k_4 M_{x4})/(x_3 - x_4)$$

wherein $$p_1 = -2k_0/k_1 \ldots p_4 = -2k_0/k_4$$

the maximum of this value $k_0 \overline{P}$ being a measure of the weight of the wheel.

Additional objects and advantages of the present invention will become apparent upon consideration of the following description when taken in conjunction with the accompanying drawings, in which:

FIGURES 1a, 1b, and 1c are aligned diagrammatic representations showing the positions of the measuring points, with FIGURE 1a being a side view of a rail section used in making the weight measurement, FIGURE 1b representing the points at which the weight and supporting forces act on the rail, and FIGURE 1c giving the points involved.

FIGURE 2 is a circuit diagram showing means which utilize the output of the measuring devices.

FIGURE 3 is a circuit diagram showing modified means for utilizing the output of the measuring devices.

FIGURES 4, 5a, 5b, and 6 are bottom views showing how the measuring devices may be attached to the rail.

Figure 7:
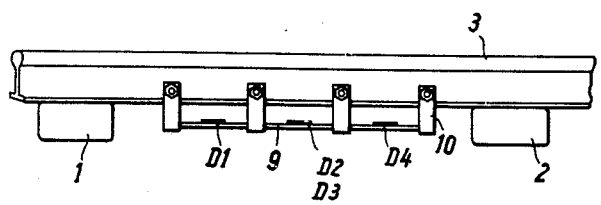

FIGURE 7 shows another way in which the measuring devices may be attached.

Referring now to the drawings, FIGURE 1a, which does not purport to be drawn to scale, shows two spaced-apart railroad ties 1 and 2 supporting a rail 3 which is subjected to a load constituted by a railroad car axle of which only the wheel 4 is illustrated. FIGURE 1b is a simplified representation of the position of the load P exerted by the wheel 4 as well as the positions of the supporting forces A and B. The effective distance between the supporting points is shown at L, this distance depending mainly on the rigidity of the rail bed. The minimal distance $L_{min}$, which would be the effective distance if the rail bed were completely rigid, is equal to the actual distance between the ties 1 and 2.

According to the present invention, an appropriate number—here, four—of measuring means constituted by signal originators D1, D2, D3, D4, are arranged at four measuring points $x_1$, $x_2$, $x_3$, $x_4$, respectively, which points are arranged within this minimal distance, as shown in FIGURE 1c. These measuring devices measure, respectively, values $k_1 M_{x1}$, $k_2 M_{x2}$, $k_3 M_{x3}$, $k_4 M_{x4}$, which are proportional to the bending moments to which the rail is subjected at these points under the influence of a load.

In order to obtain values proportional to the bending moments $M_{x1}$, $M_{x2}$, etc., to which the rail is subjected, the signal originators D1, D2, etc. can advantageously be constituted by strain gauges whose resistances $R_1$, $R_2$, etc. are then arranged in a measuring bridge such that from their relative resistance changes $\Delta R_1$, $\Delta R_2$, etc., which equal $r_1$, $r_2$, etc., a value can be measured which is proportional to the above-mentioned load $\overline{P}$. Such an arrangement is shown in FIGURE 2, in which a voltage source 5 is connected across one of the diagonals of the bridge, the other diagonal being connected to an amplifier 6 having output terminals 7 and 8. Thus, when a wheel rolls over the rail section lying between the ties 1 and 2, there will appear across the second diagonal of the bridge, and consequently at the output terminals of the amplifier, a voltage the maximum of which is proportional to the wheel load P and independent of the distance L.

Inasmuch as the load of a rail vehicle is generally distributed unevenly between the left and right wheels, there will, in practice, be a similar arrangement at the other rail. If this arrangement likewise comprises strain gauges, then the respective resistances $R_1'$, $R_2'$, $R_3'$, $R_4'$, will be incorporated in the bridge as shown in FIGURE 3. Thus, there is obtained an output value which is proportional to the mean of the loads on the right and left wheels.

The fact that the value $k_0\overline{P}$, which serves as a measure for the weight to be determined, is independent of the distance L, will be seen from the following, it being assumed that the load P rolls in the direction of the arrow $4a$ (FIGURE 1a) from $-L/2$ to $+L/2$.

If $L_1$ is the point of the load P between the limits $-L/2 \leq L_1 \leq +L/2$, then $$A = P/2 \cdot (1 - 2L_1/L)$$
$$B = P/2 \cdot (1 + 2L_1/L)$$

The bending moment $M_x$ acting on the rail at the point $x$ which is caused by the load is then given, after transposing, by $$M_x = -P \cdot L/4 \ (1 - 2L_1/L)(1 + 2x/L)$$

if $$x \leq L_1$$

and $$M_x = -P \cdot L/4 \ (1 + 2L_1/L)(1 - 2x/L)$$

if $$x \geq L_1$$

The value $M_x$ is proportional to the load P, but is also dependent on the distance L. $M_x$ is proportional to the tensile load of the rail, and the latter, in turn, is proportional to the changes in length at the point involved.

According to the present invention, the signal originators are arranged at the points $x_1$, $x_2$, $x_3$, and $x_4$, respectively, which are within the distance $L_{min}$, these points, for the sake of simplicity, being so selected that $(x_1 - x_2)$ equals $(x_3 - x_4)$, it being these signal originators which determine the values $M_{x1}$ through $M_{x4}$, respectively. If $-PL/4 = M_0$, $2L_1/L = a$, $2x_1/L = b_1$, ... $2x_4/L = b_4$, then if $L_1 < x_1$ (i.e., if the load is to the left and exteriorly of the measuring points), then $$M_{x1}/M_0 = (1+a)(1-b_1) = m_1$$
$$M_{x2}/M_0 = (1+a)(1-b_2) = m_2$$
$$M_{x2}/M_0 = (1+a)(1-b_3) = m_3$$
$$M_{x4}/M_0 = (1+a)(1-b_4) = m_4$$

If, then $\overline{m}$ is made equal to $(m_1 - m_2) - (m_3 - m_4)$, then there is obtained, on the above assumptions, $$\overline{m} = (1+a)(-b_1 + b_2 + b_3 - b_4) = 0$$

If, however, $x_2 < L_1 < x_3$ (which occurs when the load is between the two inner measuring points), then $$m_1 = (1-a)(1+b_1)$$
$$m_2 = (1-a)(1+b_2)$$
$$m_3 = (1+a)(1-b_3)$$
$$m_4 = (1+a)(1-b_4)$$

and $$\overline{m} = (b_1 - b_2 + b_3 - b_4) - a(b_1 + b_4 - b_2 - b_3)$$
$$= (b_1 - b_2 + b_3 - b_4)$$

Thus, the value $$\overline{M} = (M_{x1} - M_{x2}) - (M_{x3} - M_{x4}) = \overline{m} \cdot M_0$$
$$= -(x_1 - x_2) \cdot \overline{P}/2$$

It will be seen from the above that the value $\overline{M}$ disappears independently of the distance L when the load P is exteriorly of the four measuring points $x_1$, $x_2$, $x_3$, $x_4$, but is constant and proportional to P between the two inner measuring points $x_2$ and $x_3$; Q.E.D. Inasmuch as no limiting assumptions were made concerning the distance $x_3 - x_4$ it follows that the above proof remains valid if the measuring points $x_2$ and $x_3$ coincide.

If, in contradistinction to the above, the distances $(x_1 - x_2)$, $(x_3 - x_4)$ are selected to be different, this can be compensated for by taking an appropriate correction factor into consideration:

$$\overline{M} = (M_{x1} - M_{x2}) - q \cdot (M_{x3} - M_{x4}); \quad q = (x_1 - x_2)/(x_3 - x_4)$$

Inasmuch as within the above limits $\overline{M} = -(x_1 - x_2) \cdot \overline{P}/2$, there is obtained within these limits $$-\overline{P}/2 = (M_{x1} - M_{x2})/(x_1 - x_2) - (M_{x3} - M_{x4})/(x_3 - x_4)$$

If each signal originator measures a value $k_1 M_{x1}$, $k_2 M_{x2}$, etc., there is then obtained, by introducing a compensating factor $k_0$ and factors $p_1 = -2k_0/k_1$, ... $p_4 = -2k_0/k_4$ which consider inter alia, the characteristics of the signal originators, the above-mentioned value $$k_0 \overline{P} = (p_1 k_1 M_{x1} - p_2 k_2 M_{x2})/(x_1 - x_2)$$
$$- (p_3 k_3 M_{x3} - p_4 k_4 M_{x4})/(x_3 - x_4)$$

which, between $x_2$ and $x_3$, serves as a measure for the weight to be determined. This is simplified if the distances $(x_1 - x_2)$ and $(x_3 - x_4)$ are made equal to each other and if identical signal originators are used.

Figure 4:
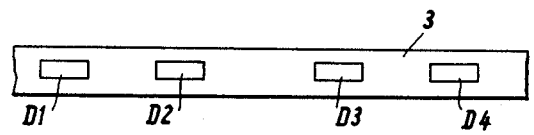
Figure 5A:
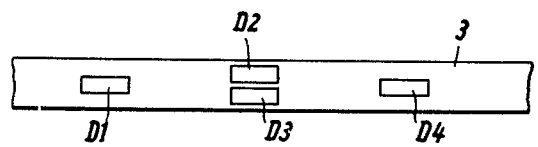
Figure 5B:
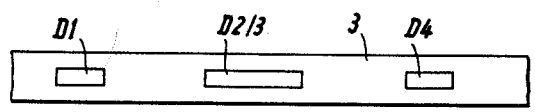

As shown in FIGURES 1 and 4, the signal originators, such as the strain gauges, can be attached to the underside of the rail, the outer originators D1 and D4 being arranged within the minimal distance $L_{min}$. If the points $x_2$ and $x_3$ coincide, the signal originators will be arranged as shown in FIGURE 5a, with FIGURE 5b showing a modification which can be used if signal originators are attached to each rail. Inasmuch as the electrical values of the signal originators D2 and D3, such as the resistances $R_2$ and $R_3$, can be serially connected in the bridge circuit as shown in FIGURE 3, the two signal originators can be combined into a composite signal originator $D2/3$ which is produced with a double output value.

Figure 6:
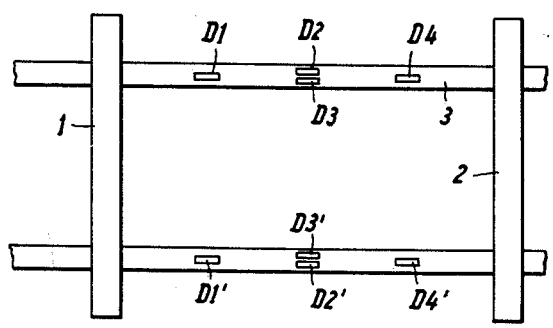

FIGURE 6 shows an arrangement in which signal originators D1 ... D4, and D1' ... D4' are arranged on the two rails, in the manner corresponding to that shown in FIGURE 5a. The resistances $R_1$ ... $R_4$ and $R_1'$ ... $R_4$, will then be arranged as shown in FIGURE 3.

The present invention is not limited to an arrangement in which the signal originators responding to the bending moment are attached to the rails themselves. It is possible, as shown, for instance, in FIGURE 7, to mount the signal originators on a preferably elastic auxiliary body 9 which is secured to the rail 3 by means of strong clamps 10.

It will be understood that the above description of the present invention is susceptible to various modifications, changes and adaptations, and the same are intended to be comprehended within the meaning and range of equivalents of the appended claims.

We claim:

1. A system for determining the weight of a rail vehicle wheel by measuring the elastic deformation to which a rail is subjected under the influence of the weight of the wheel, which rail is supported by ties spaced apart a given minimal distance, said system comprising, in combination: four measuring means arranged, respectively, at four points $x_1$, $x_2$, $x_3$, $x_4$, along the rail which points are within said minimal distance, for determining values $k_1 M_{x1}$, $k_2 M_{x2}$, $k_3 M_{x3}$, $k_4 M_{x4}$ which are proportional to the bending moments $M_{x1}$, $M_{x2}$, $M_{x3}$, $M_{x4}$ occurring at said points, respectively, said measuring means comprising electrical resistor means; and means for obtaining from said values the value $$k_0 \overline{P} = (p_1 k_1 M_{x1} - p_2 k_2 M_{x2})/(x_1 - x_2)$$
$$- (p_3 k_3 M_{x3} - p_4 k_4 M_{x4})/(x_3 - x_4)$$

wherein $p_1 = -2k_0/k_1$ ... $p_4 = -2k_0/k_4$, the maximum of said value $k_0 \overline{P}$ being a measure of the weight of the wheel, said last-mentioned means connecting said electrical resistor means to form a bridge circuit such that when a source of electrical energy is applied across one diagonal of said bridge circuit, said value $k_0 \overline{P}$ may be taken from the output of the other diagonal.

2. A system as defined in claim 1 wherein said points $x_2$ and $x_3$ coincide with each other.

3. A system as defined in claim 2 wherein the two measuring means arranged at said points $x_2$ and $x_3$ are combined into a composite measuring means.

4. A system as defined in claim 3 wherein each of the two measuring means at said points $x_1$ and $x_4$ and said composite measuring means located at the coinciding points $x_2$, $x_3$, is connected to an auxiliary body which is firmly attached to the rail.

5. A system as defined in claim 1 wherein the distance between the points $x_1$ and $x_2$ is equal to the distance between the points $x_3$ and $x_4$.

6. A system as defined in claim 1 wherein said measuring means comprise strain gauges.

7. A system as defined in claim 1 wherein said measuring means are connected directly to the rail.

8. A system as defined in claim 1 wherein said measuring means are connected to an auxiliary body which is firmly attached to the rail.

9. A system as defined in claim 8 wherein said auxiliary body is elastic.

References Cited in the file of this patent

UNITED STATES PATENTS

| 2,597,751 | Ruge | May 20, 1952 |
| 2,815,480 | Ruge | Dec. 3, 1957 |

FOREIGN PATENTS

| 552,587 | Canada | Feb. 4, 1958 |

OTHER REFERENCES

"Strain Gage Techniques," U.C.L.A., 1958, pp. 372–376 relied on, received Dec. 15, 1958.